Aug. 13, 1957 — A. STURZENEGGER — 2,802,872

PREPARATION OF DIKETENE

Filed April 9, 1954

United States Patent Office 2,802,872
Patented Aug. 13, 1957

2,802,872

PREPARATION OF DIKETENE

August Sturzenegger, Clifton, N. J., assignor to Hoffmann-La Roche Inc., Nutley, N. J., a corporation of New Jersey Application April 9, 1954, Serial No. 422,146

4 Claims. (Cl. 260—585.5)

This invention relates to the preparation of diketene by the dimerization of ketene.

Procedures are known for manufacturing ketene from acetone on an economical commercial basis. Illustrative of such procedures are those disclosed in United States Patents 2,053,286 and 2,069,243. The ketene product obtained by the thermal decomposition of acetone in processes of this type is not obtained pure, but rather is first produced as a component of a gas mixture containing essentially, in addition to the ketene, unconverted acetone, ethylene, carbon monoxide and methane. The bulk of the unconverted acetone is easily removed, to produce a gas mixture containing ethylene, carbon monoxide, methane, a small amount of residual acetone, and ketene in a proportion of from about 25 per cent to about 40 per cent by volume of the total mixture. Ketene is a highly reactive, relatively unstable gas, and consequently it is not feasible to isolate this component from the mixture, and store it, as monomeric ketene. The practice has been to recover the ketene value of the acetone crack gases by conversion of the ketene to a more stable, more easily handled product: either by reacting the ketene with another substance, e. g. by reacting ketene with acetic acid to form acetic anhydride; or by dimerizing the ketene to form diketene.

In view of the high reactivity and instability of ketene contained in acetone crack gas mixtures of the type referred to above, it is quite difficult to process such mixtures so as to efficiently effect the dimerization of the ketene contained therein. Competitive with the desired reaction, dimerization of ketene to diketene, are at least two other undesired reactions, i. e. polymerization of the ketene to produce high boiling polymers, and decomposition of the ketene or of its dimer. One method proposed in the prior art for dimerizing ketene involves the separation of ketene from the mixture of acetone crack gases by liquefaction of the ketene, and the subsequent dimerization of the substantially pure ketene. Still other prior methods teach the dimerization of ketene after it has been dissolved in an inert liquid solvent therefor; more particularly, it has been proposed to use either the starting material, acetone, or the ultimate product, diketene, as the solvent. For various reasons, the prior art methods have either not been adaptable at all to large scale commercial operation or have left a great deal to be desired from the point of view of operating efficiencies.

An important object of the present invention, accordingly, is to provide an efficient process, adaptable to large scale commercial operation, for converting to diketene the ketene contained in gases produced by the thermal decomposition of acetone.

In a broad aspect, the invention relates to a process of converting ketene to diketene wherein in a first step ketene is dissolved in a liquid non-reactive with ketene and comprising essentially diketene, and in a second step the ketene dissolved in said liquid is permitted to dimerize, said second step of ketene dimerization being substantially separate from said first step of ketene dissolution.

More particularly, the invention relates to a process of converting ketene to diketene characterized by substantially separate steps of ketene absorption in a liquid solvent non-reactive with ketene and comprising essentially diketene, and ketene dimerization in the same solvent, said absorption step comprising dissolving gaseous ketene in said solvent under superatmospheric pressure, and said dimerization step comprising flowing the solution of ketene through an extended reaction zone in substantially streamline liquid flow. In a more specific aspect, the invention relates to a continuous process of converting ketene to diketene which comprises a step of effecting absorption by continuously dissolving gaseous ketene in liquid diketene under a pressure of from about 3 atmospheres absolute to about 6 atmospheres absolute and at a temperature of from about minus 5° C. to about 50° C., and a substantially separate step of effecting dimerization by continuously passing the solution containing ketene dissolved in liquid diketene through an extended reaction zone in substantially streamline liquid flow under a pressure of from about 3 atmospheres absolute to about 6 atmospheres absolute and at a temperature of from about minus 5° C. to about 50° C. until at least about 90 percent of the dissolved ketene has been converted.

The invention is further disclosed in the following description and the accompanying single sheet of drawings, wherein equivalent structures are identified by like reference characters, and wherein Figure 1 is a diagrammatic representation of one form of apparatus in which the invention can be practiced;

Figure 1:
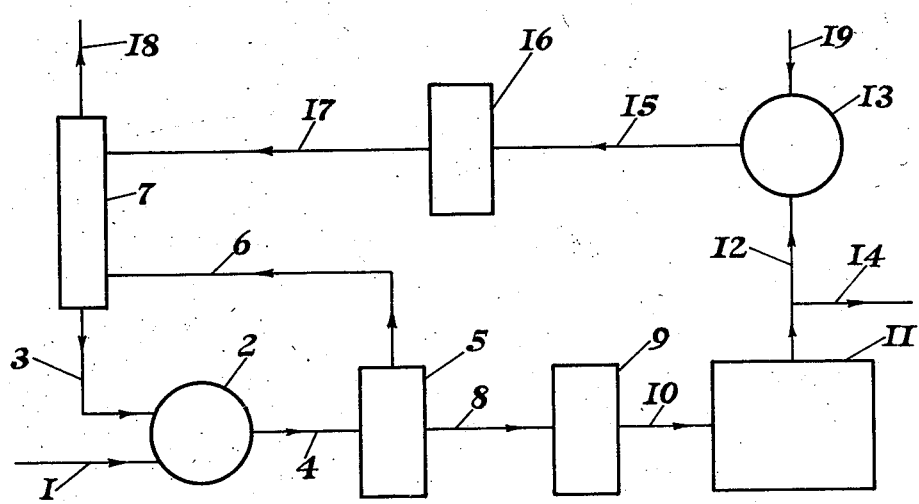

Referring more particularly to Figure 1, the line 1 represents a conduit means for introducing feed gas into an intake port of a liquid-seal rotary compressor 2. Conduit means 3 introduces feed liquid into another intake port of compressor 2. Line 4 represents a conduit means for conducting a mixture of liquid and gas from a high pressure exit port of compressor 2 to a separator 5, from which separated gas passes by a conduit means 6 to an absorber 7, while separated liquid passes by a conduit means 8 to a heat exchanger 9, and thereafter, through a conduit means 10 to a reactor 11. On leaving reactor 11, the liquid stream passes through a conduit means 12 to a recycling pump 13. Conduit means 12 is provided with a means 14 for drawing off all or a portion of the liquid stream which enters conduit means 12. Pump 13 circulates the liquid stream through a conduit means 15 to a heat exchanger 16; and thence through a conduit means 17 to absorber 7. From the latter, by way of the previously mentioned conduit means 3, liquid is supplied to compressor 2. A conduit means 18 conducts unabsorbed gases away from absorber 7. A conduit means 19 is provided for introducing liquid into the system, via pump 13, when fresh feed liquid is required.

The apparatus should be constructed of materials which exert no deleterious effect on ketene and diketene. Wherever metal parts come in contact with the feed materials or product materials, the use of stainless steel is preferred. Conventional commercially available apparatus can be used for most of the components shown in Figure 1. For example, the liquid-seal rotary compressor 2, the heat exchangers 9 and 16, the gas-liquid separator 5 and the recycling pump 13 may be of conventional type. The liquid-seal rotary compressor may, for example, suitably be either a low pressure or high pressure compressor of the type discussed at pp. 213–217 of "Chemical Process Machinery" by Riegel, 2nd edition, 1953, published by Reinhold Publishing Corporation, New York, N. Y.; wherein those parts of the compressor which are in contact with liquid and gas processed are made of stainless steel. The absorber 7 may advantageously be a conventional absorption column into which the gas stream and the liquid stream are introduced in countercurrent flow and which is provided with suitable packing to provide good contact between gas and liquid. For some methods of operation within the invention, certain of the components may be omitted; for example, either or both of the heat exchangers 9 and 16 may be superfluous, in view of particular operating temperatures desired in reactor 11 and absorber 7, respectively.

Figure 2:
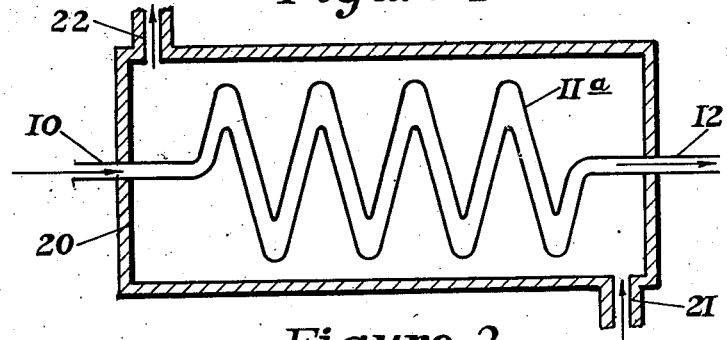
Figure 2 is a diagrammatic sectional representation of a form of reactor for use in practicing the invention.

For reasons explained hereinafter, the reactor 11 should be one which affords an extended reaction zone and should be designed to offer as little resistance to liquid flow as possible, taking into account the required throughput capacity of the system. Ideally, such a reactor is a narrow, elongated pipe of circular cross section, and indeed such a reactor can be used in installations where only small throughput capacity is required. The pipe line reactor operates most efficiently when extended in a straight line, but may be arranged in some other manner in order to conserve space, e. g. in a coil, for instance as illustrated in Figure 2 of the drawings. In Figure 2, the reactor is represented by a pipe 11a, surrounded by a jacket 20 to enclose a circulating coolant, such as brine, provided for the purpose of removing excess heat from the contents of the reactor 11a. Fresh coolant is supplied through conduit means 21, and spent coolant is removed through conduit means 22. The symbols 10 and 12 represent respectively the input conduit means to the reactor 11a and the output conduit means from the reactor 11a.

Figure 3:
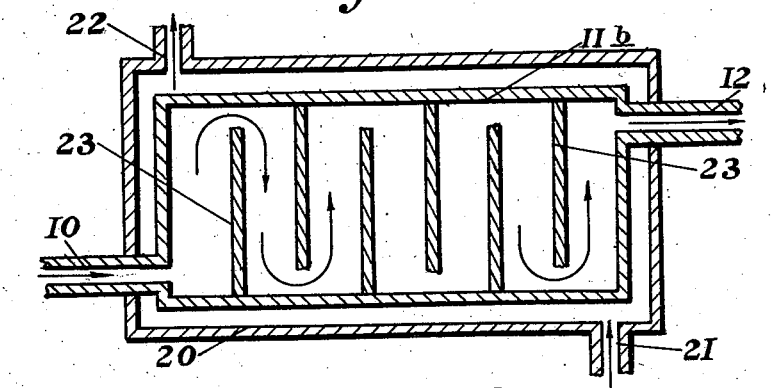
Figure 3 is a diagrammatic sectional representation of a second form of reactor for use in practicing the invention.

In large scale commercial operation, however, pipe line reactors are not desirable because they require excessive amounts of tubing and because they are not compact. A suitable form of reactor for commercial scale operation is illustrated in Figure 3. Such a reactor may take the form of a cylindrical tank 11b provided with a coolant jacket 20. The tank is provided with vertical baffles 23 alternately extending from the top and bottom thereof and providing an elongated path of flow for the liquid stream passing through the tank. The symbols 10 and 12 represent respectively the input conduit means to the reactor 11b and the output conduit means from the reactor 11b. The symbols 21 and 22 represent respectively the input conduit means for introducing coolant into jacket 20 and the exit conduit means for removing coolant from jacket 20. If required to provide adequate throughput capacity, a number of jacketed tanks such as shown in Figure 3 may be connected in series.

In practicing the process of the invention in the apparatus shown diagrammatically in Figure 1, a feed gas produced by thermal decomposition of acetone and containing ketone, methane, carbon monoxide, ethylene and a small amount of residual acetone, is introduced through line 1 into compressor 2. A liquid stream, comprising essentially diketene, is supplied from line 17 through absorber 7 and line 3 to compressor 2 and serves as the sealing liquid therein. In starting a production run, an initial quantity of substantially pure liquid diketene is supplied to the system through line 19; but as the run continues, the recycled liquid diketene supplied through line 17 will contain small quantities of other materials, e. g. dissolved unconverted ketene, dissolved acetone, high boiling polymers of ketene, etc. The liquid stream leaving the compressor through line 4 comprises diketene containing dissolved ketene, the latter of course being present in very much higher proportion than in the feed stream supplied through line 17. Also passing through line 4, partially in entrainment with the liquid, are the gases contained in the feed stream introduced through line 1 which are not absorbed in compressor 2. These comprise mainly methane, carbon monoxide and ethylene, together with the quantity of ketene not absorbed in compressor 2. The stream of liquid-gas mixture is passed to separator 5. The gases separated therein, i. e. methane, carbon monoxide, ethylene, ketene and traces of acetone, are passed through line 6 to absorber 7. The liquid separated in separator 5, comprising diketene having dissolved therein the bulk of the ketene contained in the feed gas, together with the residual acetone contained in the feed gas, is passed through line 8, heat exchanger 9 and line 10 to the dimerization zone; that is, to reactor 11. The residence time of the liquid in the reactor, i. e. the rate of throughput, is controlled so that substantially all of the dimerization of the dissolved ketene to produce diketene takes place in the dimerization zone, reactor 11. The liquid stream leaving reactor 11, comprising essentially diketene with minor amounts of dissolved unconverted ketene, dissolved residual acetone, higher polymerization products of ketene and decomposition products of ketene and diketene, passes into conduit 12. A sufficient portion of the liquid stream is withdrawn through draw-off means 14 to maintain the volume of liquid recycled in the system substantially constant. The remainder of the liquid stream passes to pump 13, whereby it is recycled, through line 15, heat exchanger 16, line 17 and absorber 7, into line 3. In that embodiment of the apparatus wherein 7 is a conventional absorption column, the entering stream of liquid may flow countercurrently, as previously mentioned, to the entering stream of gases introduced through line 6; and the greater part of that portion of ketene in the feed gas which was not absorbed into the liquid in compressor 2 will be absorbed into the liquid in absorber 7. Unabsorbed gases, comprising essentially methane, carbon monoxide, ethylene, and very minor amounts of ketene and acetone, are vented to atmosphere through line 18, which may contain suitable apparatus (not shown), e. g. alkali scrubbers, for removing noxious components such as the residual ketene. Fresh makeup diketene is supplied through line 19 as required.

The liquid drawn off through means 14 is submitted to fractionation; preferably in two stages, wherein in the first stage acetone (and other low boilers) are removed as distillate at moderate subatmospheric pressure, e. g. 100 mm. of mercury, and a second stage wherein substantially pure diketene is removed as distillate at a somewhat lower subatmospheric pressure, e. g. 50 mm. of mercury.

In a continuous cyclic process for the conversion of ketene to diketene of the type described above with reference to Figure 1, the overall yield of diketene cannot exceed the percentage conversion of ketene. For, when such a continuous process reaches a steady state, any ketene not converted passes to waste as a component of the gases in line 18. Accordingly, the process of the invention is so operated as to attain a percentage conversion of ketene not less than about 90 percent, and preferably not less than about 95 percent. Indeed, the invention makes it possible to attain conversion rates as high as about 99 percent. Under optimum conditions, the process of the invention is characterized by very high percentage conversions of ketene, and by overall percentage yields of diketene closely approaching the percentage conversions of ketene.

As previously indicated, the desired or main reaction wherein ketene is dimerized to diketene takes place simultaneously with side reactions of the nature of degradation and higher polymerization. Even when the temperature of the dimerization process is at an optimum, i. e. a temperature at which the rate of the main reaction is at a maximum as compared with the rates of the side reactions, the latter cannot be completely suppressed. Indeed, even at optimum temperatures the side reactions have an appreciable rate, and if the time required to effect the desired percentage conversion of ketene is excessive, a relatively large proportion of the ketene converted will be transformed to products other than the desired diketene. Accordingly, the problem of practical commercial manufacture reduces itself to finding those environmental conditions, other than optimum temperature, which will make it possible to effect the desired percentage conversion of ketene, at that optimum temperature, within the shortest possible time.

In simple terms, the necessary operations in converting ketene to diketene are first, to get the ketene into solution, and second, to dimerize the dissolved ketene. The conditions favoring the execution of the absorption operation with maximum efficiency, however, have been found to be not identical with those which favor the execution of the dimerization operation with maximum efficiency.

An important teaching of the instant invention, accordingly, is that of effecting the manufacture of diketene in two substantially separate steps; i. e., a first step in which ketene is absorbed in a liquid solvent non-reactive with ketene and comprising essentially diketene, under conditions most favorable to the absorption; and a second step, wherein the ketene dissolved in the liquid solvent is dimerized, under conditions most favorable to the dimerization; substantially all of the absorption but substantially none of the dimerization taking place in the first step, and substantially none of the absorption but substantially all of the dimerization taking place in the second step. The reference to substantially separate steps, in the context of the present invention, signifies that not more than about 25 percent at most, and preferably not more than about 5 percent, of the total amount of ketene converted to other materials, is converted in the absorption step; the balance of about 75 percent at least, and preferably at least about 95 percent, being converted entirely in the dimerization step.

Thus, in the system illustrated in Figure 1, practically the entire absorption of ketene in diketene occurs in a first stage of the process, defined by two physically separated but functionally continuous substages taking place respectively in absorber 7 and compressor 2. Under the usual conditions of operation, by far the greater part of the dissolution of ketene in liquid is effected in compressor 2, but a certain amount of ketene not absorbed in compressor 2 is, as explained above, absorbed into the liquid in absorber 7. The important points to note are that practically all of the absorption of ketene is effected in a first process step which takes place in absorber 7 and compressor 2, whereas substantially all of the conversion of the dissolved ketene, at least about 75 percent and preferably at least about 95 percent of the total amount converted, is effected in a second process step which takes place in reactor 11. The total time required for transit of the circulating liquid through the absorption zone, absorber 7 and compressor 2, is in all cases fairly short as compared with the time spent by the liquid in the reactor zone, reactor 11. Particularly, the time required for passage through compressor 2, where concentrations of ketene are high, is quite short. The circulating liquid, from the time of dissolution of the bulk of the ketene therein until the removal from the system of the diketene produced, spends practically all of its transit time in the reactor zone, under controlled conditions favoring the desired reaction of dimerization. The proportion of ketene molecules exposed for any appreciable length of time to conditions favoring the undesired degradation and/or polymerization reactions is small.

By so separating the dissolution step from the dimerization step, it has been found that the overall time required to attain the desired percentage conversion of ketene can be appreciably decreased, and that the overall yields of diketene realized by the process of the invention are thereby materially increased.

A characteristic of prior art processes of converting ketene to diketene, in which the absorption of ketene has usually been effected concurrently with and in the same vessel as the dimerization of dissolved ketene, is the fact that a considerable portion of the ketene solution has, because of turbulence in the reaction mixture and resulting eddy currents and channeling, been retained in the reaction zone for an appreciably longer time than the minimum time necessary to effect the desired percentage conversion of the ketene contained in that portion of the solution. The result has been unnecessary exposure of dissolved ketene molecules (and/or diketene molecules formed) to conditions which permit their conversion, by side reactions, to form undesired byproducts; and consequent losses in yields of diketene.

A significant contribution of the present invention is the realization of the fact that side reactions are markedly increased when the residence times in the dimerization zone of different portions of the ketene solution vary to any great extent; and the corollary teaching that measures must be taken to insure, for each alliquot portion of diketene solution containing dissolved ketene, a substantially uniform residence time in the dimerization zone, not substantially longer than the minimum time required to effect the desired percentage conversion of ketene to diketene. Turbulent flow of liquid in the dimerization zone (with accompanying uncontrollable conditions of circulation) tends to produce non-uniformity of residence time in that zone, and thereby certain portions of the ketene solution may remain in the dimerization zone for a substantially longer time than that ideally required to effect the desired degree of conversion. Accordingly, it is an important teaching of the present invention to avoid turbulent flow in the dimerization zone. This is accomplished, according to a previously described feature of the invention, by substantially completely separating the absorption step (which depends for its efficient operation upon the presence of turbulene) from the dimerization step of the process; and according to a related feature of the invention, by passing the solution of ketene dissolved in liquid diketene through the dimerization zone in substantially streamline liquid flow. In practice, of course, ideal streamline flow is not attainable; but a very good practical approximation to ideal streamline flow can be attained by designing the dimerization zone so that it approaches as closely as possible, consistently with the required throughput capacity, to a smooth-walled, elongated pipe of narrow circular cross section. Two reactors embodying this principle of construction are illustrated in Figures 2 and 3 of the drawings, respectively; but other equivalent reactors will suggest themselves to those skilled in the art, and apparatus suitable for use as a reactor in practicing this aspect of the invention is not limited otherwise than by the process requirement that the liquid pass through the dimerization zone in substantially streamline flow. The concept of substantially streamline liquid flow requires then, in the context of the present process, that every portion of the ketene solution flow through the dimerization zone in substantially the same transit time. Perhaps a more homely way of expressing this thought is that the flow through the reactor must be of the "first in-first out" type; that, as a general rule, the molecules of ketene entering the dimerization zone must, after they are associated together to form diketene, leave that zone in the same order in which they entered.

The beneficial effects of the previously discussed features of the invention (teaching the substantial separation of the dimerization operation from the absorption operation, and the circulation of ketene solution through the reaction zone in substantially streamline liquid flow) will lead to improvement in yields even when operating under temperature and pressure conditions considered optimal by the prior art. However, an additional aspect of the present invention teaches operation of the process under preferred conditions described in detail below:

FEED TO PROCESS

*Gas feed.*—It has been mentioned that acetone crack gases, such as produced by the known processes of U. S. Patents 2,053,286 and 2,069,243, and which are suitable for use as feed gases in processes included within the instant invention, may contain from about 25 to about 40 percent by volume of gaseous ketene (after removal of the bulk of the unconverted acetone from the thermal decomposition process), the balance comprising essentially ethylene, carbon monoxide, methane and residual gaseous acetone. For purposes of manufacturing diketene according to the present invention, it is preferable to effect the thermal decomposition of acetone under such conditions that the gas mixture fed into line 1 of the above described apparatus of Figure 1 contains about 35 percent by volume of ketene. The rate of feed depends of course on the throughput capacity of the system.

*Liquid feed.*—The quantity of liquid circulated by pump 13 to the absorption zone (absorber 7 and compressor 2) is not critical, but rather may be varied between wide limits. On the one hand, it is desired that the quantity of liquid supplied to the absorption zone be large enough to facilitate quick absorption of ketene supplied in the feed gas, and thereby to favor rapid completion of the absorption step. On the other hand, all the liquid circulated through the absorption zone must of course also be circulated through the reactor zone. The latter must have a capacity large enough to handle not only the recycled liquid, but also the liquid diketene produced by the dimerization of ketene. In the interest of keeping the required reactor capacity to a minimum, therefore, it is desirable to keep the quantity of recycled liquid to a minimum. As an additional consideration, the smaller the quantity of liquid recycled, the more concentrated the resulting solution of ketene will tend to be. Concentrated solutions of ketene favor more rapid completion of the desired dimerization reaction, and consequently favor a lower proportion of conversion to undesired byproducts. It will thus be apparent that the quantity of liquid selected for recycling must represent a compromise between somewhat opposing desiderata. The present invention teaches the use of solutions of ketene which are as concentrated as possible, consistent with other process requirements disclosed herein. In any event, the quantity of liquid recycled must permit completion of the absorption step within a short enough time that not more than about 25 percent conversion of ketene, at most, and preferably not more than about 5 percent, occurs during the absorption step.

ABSORPTION STEP

The rate of absorption of ketene in diketene depends primarily upon the pressure and temperature in the absorption zone, and of course also upon the quantity of liquid solvent made available in the absorption zone in relation to the quantity of ketene supplied, and the efficiency with which contact is effected between gas and liquid. The use of a liquid-seal rotary compressor as the particular absorption device possesses a great merit, in that this type of compressor affords at once an excellent means for controlling the pressure, and an excellent means for effecting efficient contact between gas and liquid. The rate of absorption of ketene in the solvent (as also the concentration of ketene in the solvent) increases, as the pressure in the absorption zone increases. The present invention teaches the use of superatmospheric operating pressures in the absorption zone defined by compressor 2 and absorber 7. Excellent results have been obtained, in practicing the invention in the apparatus illustrated in Figure 1, when compressor 2 and absorber 7 are operated at a pressure of from about 2 atmospheres absolute to about 9 atmospheres absolute; a preferred operating range is from about 3 atmospheres absolute to about 6 atmospheres absolute. Compressor 2 and absorber 7 ordinarily are, but need not necessarily be, operated at the same pressure. The temperature in the absorption zone (i. e. in compressor 2 and absorber 7), in the process of this invention, should be in the range of from about minus 5° C. to about 50° C.; a preferred range is from about 0° C. to about 25° C. In the embodiment of the invention described above with reference to Figure 1, the temperature in absorber 7 is most conveniently regulated by adjusting the temperature of the liquid fed thereto, as by heat exchange in the apparatus element indicated at 16 in the drawing. If necessary or desirable, further temperature control can be achieved by circulating a heat exchange fluid through a jacket surrounding absorber 7. The temperature in compressor 2 is most conveniently regulated by adjusting the temperature of the liquid supplied thereto from absorber 7. Ordinarily, the liquid will be supplied to compressor 2 at the same temperature it has when issuing from absorber 7; but this is not obligatory, and a heat exchanger may be inserted in line 3, if desired, for the purpose of adjusting the temperature of the circulating liquid before it passes into compressor 2. A further, albeit minor, degree of regulation of the temperature in compressor 2 can be effected by controlling the temperature of the feed gas supplied through line 1.

DIMERIZATION STEP

The rate of dimerization of dissolved ketene to diketene depends primarily upon the temperature in the dimerization zone and upon the concentration of dissolved ketene in the liquid. The temperature in the reaction zone 11 is influenced in part by the temperature of the liquid supplied through line 10 and (since ketene dimerization is an exothermic reaction) also by the rate at which heat is abstracted. Since the temperature of liquid entering reactor 11 from compressor 2 is increased by the heat of compression and heat of solution liberated in the compressor, it may be necessary to cool the liquid leaving the compressor, as by heat exchanger 9, before the liquid is passed onward to reactor 11. Alternatively, under certain conditions of operation, it may be necessary to heat the liquid stream, as by heat exchanger 9, before it enters reactor 11. Further regulation of temperature can be achieved, if desired, by circulating coolant through jacket 20 (see Figs. 2 and 3). The concentration of ketene in the liquid entering reactor 11 is of course initially fixed by the conditions under which the absorption zone (compressor 2 and absorber 7) is operated; and in order to prevent liberation of dissolved ketene from solution, reactor 11 is ordinarily maintained, by the compressor, at the same pressure obtaining in the exit line of the compressor. However, operation of the reactor and/or the absorber at pressures materially different from those obtaining in the exit line of the compressor is not precluded, although such operation is not ordinarily desirable. Excellent results have been obtained, in practicing the invention in the apparatus of Figure 1, when reactor 11 is operated under a pressure in the range between about 2 atmospheres absolute and about 9 atmospheres absolute, and at a temperature in the range between about minus 5° C. and about 50° C. Preferred operating ranges are, as to pressure, between about 3 atmospheres absolute and about 6 atmospheres absolute; and as to temperature, between about 15° C. and about 30° C.

When practicing the invention in the apparatus illustrated in Figure 1, the operating conditions can all be set, at values within the preferred limits stated above, to provide any desired degree of conversion of ketene, up to about 99 percent, and preferably the operating conditions are so set as to result in at least about 95 percent conversion. Given a ketene feed gas of predetermined ketene content, one can fix the operating temperature and pressure of compressor 2, the temperature and pressure in absorber 7, the temperature and pressure in reactor 11 and the volume of liquid circulated by pump 13, thereby determining the capacity that reactor 11 must have in order to provide a desired rate of flow of liquid; that is, a desired residence time of liquid in the reactor; or expressed in still other terms, a desired percentage conversion of ketene to diketene. The hold-up of liquid in absorber 7 may be disregarded in determining the capacity of the reactor, in view of the small capacity of an efficient absorber as compared with the capacity of the reactor.

In another embodiment of the invention, less preferred but also useful and still representing an improvement over prior art procedures, the process of converting ketene to diketene can be operated under atmospheric pressures. In such case, the use of a compressor can be obviated; that is to say, apparatus elements 2 and 4 in Figure 1 can be entirely eliminated, so that line 3 leads directly into separator 5, and line 1 leads into the lower portion of absorber 7. In this embodiment of the invention, inasmuch as the absorption step is necessarily conducted less efficiently than when a compressor is employed, the absorber 7 must in consequence have a larger holdup than is required when the absorber merely serves as an adjunct to the compressor. A relatively greater proportion of the conversion of ketene will thus take place during the absorption step, in this type of operation; but by suitably controlling the rate of circulation of liquid so that the residence time of dissolved ketene in the absorber is short as compared with its residence time in the reactor, the proportion of ketene converted in the absorption step can still be kept below the limits taught by the present invention, i. e. below about 25 percent. For operation under atmospheric pressures, it is preferred to keep the proportion of conversion effected in the absorption step below about 10 percent.

It will be obvious that, because of the relatively higher proportion of conversion occurring during the absorption step and the relatively lower concentration of dissolved ketene supplied to the dimerization step of a process operated under atmospheric pressures, such a process cannot be equally efficient with a corresponding process operated under superatmospheric pressures. In general, within the preferred limits of the invention, the higher the pressure the more efficient is the conversion of ketene to diketene.

The invention is further disclosed in the following examples, which are illustrative, but not limitative, thereof:

*Example 1*

A ketene feed gas produced by the thermal decomposition of acetone (according to U. S. Patents 2,053,286 and 2,069,243), and containing approximately 35 percent by volume of ketene, is introduced through line 1 in the apparatus shown in Figure 1, at the rate of 1350 grams of ketene per hour and at a temperature of 0° C. The absorber 7 is maintained at a temperature of 0° C., and liquid is circulated by pump 13 at the rate of 40 liters per hour. The exit pressure of compressor 2 is maintained at 3 atmospheres absolute (i. e. at 2 atmospheres gauge), and the same pressure is maintained in the absorber and in reactor 11. The temperature in reactor 11 is maintained at 0° C. A sufficient number of dimerization tanks of the type illustrated in Figure 3 is employed to provide a total holdup volume of 165 liters. Under these conditions, 95 percent of the ketene in the feed is converted.

*Example 2*

A ketene feed gas of the same composition as that used in the preceding example is supplied to the compressor at the rate of 2400 g./hr. of ketene, and at 0° C. The apparatus employed is that shown in Figure 1. A pressure of 22 p. s. i. gauge is maintained in the exit line of compressor 2, in reactor 11 and in absorption column 7. Liquid is circulated by pump 13 at the rate of 90 l./hr. Reactor 11 has a holdup capacity of 280 liters. A temperature of 0° C. is maintained in absorber 7, and a temperature of 40° C. in reactor 11. The percentage conversion of ketene supplied is 96 percent.

*Example 3*

In this illustration, the feed is like that in Example 1 and contains 35 percent of ketene by volume. The feed is supplied through line 1 of Figure 1 at the rate of 1350 g./hr. of ketene and at a temperature of 0° C. Liquid is circulated by pump 13 to absorber 7 at the rate of 30 l./hr. The absorber is maintained at a temperature of 0° C. Compressor 2 is operated at an exit pressure of 4 atmospheres absolute, this same pressure being maintained also in absorber 7 and in reactor 11. The latter is maintained at a temperature of 20° C. The reactor 11 is designed to furnish a holdup of 110 liters. The percentage conversion of ketene supplied in the feed is 98 percent.

*Example 4*

For this illustration, an apparatus as shown in Figure 1 is used. The absorber operates at 25° C. and 5 atmospheres absolute pressure, the reactor (holdup 50 l.) at 30° C. and 5 atmospheres absolute pressure, and the compressor at an exit pressure of 5 atmospheres absolute. A feed gas containing 35 percent by volume of ketene is supplied at the rate of 1350 g. of ketene per hour and at 0° C. Liquid is circulated by pump 13 at the rate of 50 l./hr. The percentage conversion of ketene is 93 percent.

*Example 5*

For this illustrative process, the apparatus shown in Figure 1 is employed, except that the compressor and gas-liquid separator are omitted (i. e. elements 2, 4, 5, 6 and 8 of Figure 1 are omitted, and line 3 leads directly into heat exchanger 9, while line 1 leads into the lower portion of absorber 7). The feed gas contains 35 percent by volume of ketene, and is fed into line 1 at the rate of 1350 grams of ketene per hour, and at a temperature of 0° C. Absorber 7 is operated at 0° C. and under atmospheric pressure (i. e. at 1 atmosphere absolute), whereas reactor 11 is operated at 50° C. and at atmospheric pressure. The holdup capacity of reactor 11 is 110 liters. Pump 13 circulates liquid at the rate of 125 l./hr. The percentage conversion of ketene supplied in this process is 90 percent.

I claim:

1. A continuous process of converting ketene to diketene which comprises an absorption step of forming a solution of ketene in diketene by continuously and turbulently mixing gaseous ketene with liquid diketene under a pressure of from about 3 atmospheres absolute to about 6 atmospheres absolute and at a temperature of from about 0° C. to about 25° C., and a substantially separate dimerization step of causing said solution of ketene in diketene to flow continuously in substantially streamline liquid flow at a temperature of from about 15° C. to about 30° C. and under a pressure of from about 3 atmospheres absolute to about 6 atmospheres absolute until at least about 95 percent of the dissolved ketene has been converted; the residence time of dissolved ketene in the absorption step being in such proportion to the residence time of dissolved ketene in the dimerization step that not more than about 5 percent of the total ketene converted is converted in the absorption step.

2. A continuous process of converting ketene to diketene which comprises turbulently mixing in an absorption zone a liquid stream consisting essentially of diketene, and a gas stream non-reactive with diketene and containing ketene, at a pressure of from about 3 atmospheres absolute to about 6 atmospheres absolute and at a temperature of from about minus 5° C. to about 50° C.; and continuously passing the liquid stream containing dissolved ketene through a substantially separate and extended reaction zone in substantially streamline liquid flow at a temperature of from about minus 5° C. to about 50° C. and under a pressure of from about 3 atmospheres absolute to about 6 atmospheres absolute, until at least about 90 percent of the dissolved ketene has been converted; the residence time of dissolved ketene in the absorption zone being in such proportion to the residence time of dissolved ketene in the reaction zone that not more than about 25 percent of the total ketene converted is converted in the absorption zone.

3. A process of making diketene which comprises passing a gas feed containing from about 25 percent by volume to about 40 percent by volume of ketene, the balance consisting essentially of inert gases, through an absorption stage wherein the feed gas is mixed turbulently, at temperatures between about minus 5° C. and about 50° C. and under pressures between about 3 atmospheres absolute and about 6 atmospheres absolute, with a liquid solvent for ketene consisting essentially of diketene; and passing the resulting solution containing dissolved ketene through a substantially separate reaction stage wherein said solution is allowed to flow in substantially streamline liquid flow, at temperatures between about minus 5° C. and about 50° C. and under pressures between about 3 atmospheres absolute and about 6 atmospheres absoloute, until at least about 90 percent of the dissolved ketene is dimerized; the residence time of dissolved ketene in the absorption stage being so short in comparison with the residence time of dissolved ketene in the reaction stage that not more than about 25 percent of the total ketene converted is converted in the absorption stage.

4. A continuous process of making diketene which comprises continuously passing an acetone crack-gas feed containing from about 25 percent by volume to about 40 percent by volume of ketene, the balance consisting essentially of ethylene, carbon monoxide, methane and a small amount of residual acetone, through an absorption stage wherein said feed gas is mixed turbulently, at temperatures between about 0° C. and about 25° C. and under pressures between about 3 atmospheres absolute and about 6 atmospheres absolute, with a liquid solvent for ketene consisting essentially of diketene, thereby effecting solution of gaseous ketene in said liquid solvent; and passing the resulting solution containing dissolved ketene through a substantially separate and extended reaction stage wherein said solution flows in substantially streamline liquid flow, at temperatures between about minus 5° C. and about 50° C. and under pressure between about 3 atmospheres absolute and about 6 atmospheres absolute, until at least about 95 percent of the dissolved ketene is converted; the residence time of dissolved ketene in the absorption stage being so short in comparison with the residence time of dissolved ketene in the reaction stage that not more than about 5 percent of the total ketene converted is converted in the absorption stage.

References Cited in the file of this patent

UNITED STATES PATENTS

| | | |
|---|---|---|
| 2,019,983 | Law | Nov. 5, 1935 |
| 2,216,450 | Mugdan et al. | Oct. 1, 1940 |
| 2,688,640 | Schnegg | Sept. 7, 1954 |